US005897795A

United States Patent [19]

Lu et al.

[11] Patent Number: 5,897,795

[45] Date of Patent: Apr. 27, 1999

[54] INTEGRAL SPRING CONSUMABLES FOR PLASMA ARC TORCH USING BLOW FORWARD CONTACT STARTING SYSTEM

[75] Inventors: Zhipeng Lu; Richard W. Couch, Jr., both of Hanover; Brian J. Currier, Newport, all of N.H.

[73] Assignee: Hypertherm, Inc., Hanover, N.H.

[21] Appl. No.: 08/727,019

[22] Filed: Oct. 8, 1996

[51] Int. Cl.[6] .................................................... B23K 10/00

[52] U.S. Cl. .................. 219/121.57; 219/75; 219/121.5; 219/121.52

[58] Field of Search ......................... 219/121.39, 121.45, 219/121.48, 121.5, 121.51, 121.52, 121.59, 74, 75; 313/231.31, 231.41

[56] References Cited

U.S. PATENT DOCUMENTS

| | | | |
|---|---|---|---|
| 3,004,189 | 10/1961 | Giannini . | |
| 3,242,305 | 3/1966 | Kane et al. . | |
| 3,832,513 | 8/1974 | Klasson . | |
| 4,567,346 | 1/1986 | Marhic . | |
| 4,590,354 | 5/1986 | Marhic et al. . | |
| 4,650,956 | 3/1987 | Marhic et al. . | |
| 4,701,590 | 10/1987 | Hatch . | |
| 4,791,268 | 12/1988 | Sanders et al. . | |
| 4,902,871 | 2/1990 | Sanders et al. . | |
| 4,940,877 | 7/1990 | Broberg . | |
| 4,973,816 | 11/1990 | Haberman | 219/121.48 |
| 5,083,005 | 1/1992 | Degrigny | 219/121.52 |
| 5,208,441 | 5/1993 | Broberg . | |
| 5,216,221 | 6/1993 | Carkhuff | 219/121.51 |
| 5,308,949 | 5/1994 | Reed, Jr. et al. | 219/121.5 |
| 5,409,164 | 4/1995 | Delzenne et al. | 239/79 |
| 5,464,083 | 11/1995 | Arnold et al. | 192/8 C |

FOREIGN PATENT DOCUMENTS

| | | | |
|---|---|---|---|
| 0 414 561 A1 | 2/1991 | European Pat. Off. . | |
| 40 18 423 A1 | 12/1991 | Germany . | |

OTHER PUBLICATIONS

Associated Spring, Inc. catalog Form No. 700, dated Dec. 1994; pp. front cover, copyright page, 14, 16, 18, 20, and rear cover.

Smalley Steel Ring Company catalog No. WS–93A, undated; pp. front cover, catalog number page, and 21.

Powerhold, Inc. catalog dated Jan. 1992; pp. front cover, contents, 2, rear cover.

*Primary Examiner*—Mark Paschall
*Attorney, Agent, or Firm*—Testa, Hurwitz & Thibeault, LLP

[57] ABSTRACT

Disclosed is a novel method and structure for contact starting a plasma arc torch. A translatable, electrically conductive component such as a nozzle or swirl ring is biased into contact with an electrode by a compliant spring element. A pilot arc is formed by first passing current through the electrode/component interface. Thereafter, the component is translated under the influence of gas pressure in a plasma chamber formed between the electrode and component, compressing the compliant element and initiating the pilot arc. The spring element may be maintained integrally with the nozzle, swirl ring, or a retaining cap, facilitating removal and replacement of the spring element with consumable components of the torch. Exemplary spring elements include wave spring washers, finger spring washers, curved spring washers, helical compression springs, flat wire compression springs, and slotted conical discs.

11 Claims, 7 Drawing Sheets

INTEGRAL SPRING CONSUMABLES FOR PLASMA ARC TORCH USING BLOW FORWARD CONTACT STARTING SYSTEM

TECHNICAL FIELD

The present invention relates to plasma arc torches and methods of operation, and more specifically, to a plasma arc torch and method using a contact starting system employing an electrode and a resiliently biased, translatable nozzle or swirl ring.

BACKGROUND

Plasma arc torches are widely used in the cutting of IS metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. Gases used in the torch can be non-reactive (e.g. argon or nitrogen), or reactive (e.g. oxygen or air).

In operation, a pilot arc is first generated between the electrode (cathode) and the nozzle (anode). The pilot arc ionizes gas passing through the nozzle exit orifice. After the ionized gas reduces the electrical resistance between the electrode and the workpiece, the arc transfers from the nozzle to the workpiece. The torch may be operated in this transferred plasma arc mode, which is characterized by the conductive flow of ionized gas from the electrode to the workpiece, for the cutting of the workpiece.

Generally, there are two widely used techniques for generating a pilot plasma arc. One technique uses a high frequency, high voltage ("HFHV") signal coupled to a DC power supply and the torch. The HFHV signal is typically provided by a generator associated with the power supply. The HFHV signal induces a spark discharge in the plasma gas flowing between the electrode and the nozzle, and this discharge provides a current path. The pilot arc is formed between the electrode and the nozzle with the voltage existing across them.

The other technique for generating a pilot plasma arc is known as contact starting. Contact starting is advantageous because it does not require high frequency equipment and, therefore, is less expensive and does not generate electromagnetic interference. In one form of contact starting, the electrode is manually placed into electrical connection with the workpiece. A current is then passed from the electrode to the workpiece and the arc is struck by manually backing the electrode away from the workpiece.

Improvements in plasma arc torch systems have been developed which have eliminated the need to strike the torch against the workpiece in order to initiate an arc, thereby avoiding damage to brittle torch components. One such system is disclosed in U.S. Pat. No. 4,791,268 ("the '268 patent"), which is assigned to the same assignee as the instant invention and the disclosure of which is herein incorporated by reference. Briefly, the '268 patent describes a torch having a movable electrode and a stationary nozzle initially in contact due to a spring coupled to the electrode such that the nozzle orifice is blocked. To start the torch, current is passed through the electrode and nozzle while a plasma gas is supplied to a plasma chamber defined by the electrode, the nozzle, and the swirl ring. Contact starting is achieved when the buildup of gas pressure in the plasma chamber overcomes the spring force, thereby separating the electrode from the nozzle and drawing a low energy pilot arc therebetween. Thereafter, by bringing the nozzle into close proximity with the workpiece, the arc may be transferred to the workpiece, with control circuitry increasing electrical parameters to provide sufficient energy for processing the workpiece. Plasma arc torch systems manufactured according to this design have enjoyed widespread acceptance in commercial and industrial applications.

During operation of a plasma arc torch, a significant temperature rise occurs in the electrode. In systems which employ a movable electrode, passive conductive cooling of the electrode by adjacent structure is reduced due to the need to maintain sliding fit clearances therebetween. Such clearances reduce heat transfer efficiencies relative to fixed electrode designs employing threaded connections or interference fits. Accordingly, active cooling arrangements have been developed such as those disclosed in U.S. Pat. No. 4,902,871 ("the '871 patent"), which is assigned to the same assignee as the present invention and the disclosure of which is hereby incorporated by reference. Briefly, the '871 patent describes an electrode having a spiral gas flow passage circumscribing an enlarged shoulder portion thereof. Enhanced heat transfer and extended electrode life are realized due to the increased surface area of the electrode exposed to the cool, accelerated gas flow.

While known contact starting systems function as intended, additional areas for improvement have been identified to address operational requirements. For example, in known contact starting systems, the electrode is supported in part by a spring which maintains intimate electrical and physical contacts between the electrode and nozzle to seal the exit orifice until such time as the pressure in the plasma chamber overcomes the biasing load of the spring. Degradation of the spring due to cyclic mechanical and/or thermal fatigue lead to change of the spring rate or spring failure and, consequently, difficulty in initiating the pilot arc with a concomitant reduction in torch starting reliability. Accordingly, the spring should be replaced periodically; however, due to the location of the spring in the torch body, additional disassembly effort is required over that necessary to replace routine consumables such as the electrode and nozzle. A special test fixture will typically also be needed to assure proper reassembly of the torch. Further, during repair or maintenance of the torch, the spring may become dislodged or lost since the spring is a separate component. Reassembly of the torch body without the spring or with the spring misinstalled may result in difficulty in starting or extended operation of the torch prior to pilot arc initiation.

Additionally, sliding contact portions of the electrode and proximate structure, which may be characterized as a piston/cylinder assembly, may be subject to scoring and binding due to contamination. These surfaces are vulnerable to dust, grease, oil, and other foreign matter common in pressurized gases supplied by air compressors through hoses and associated piping. These contaminants diminish the length of trouble free service of the torch and require periodic disassembly of the torch for cleaning or repair. It would therefore be desirable for moving components and mating surfaces to be routinely and easily replaced before impacting torch starting reliability.

Accordingly, there exists a need to provide a plasma arc torch contact start configuration which improves upon the present state of the art.

SUMMARY OF THE INVENTION

An improved contact start plasma arc torch and method are disclosed useful in a wide variety of industrial and commercial applications including, but not limited to, cutting and marking of metallic workpieces, as well as plasma spray coating. The apparatus includes a torch body in which an electrode is mounted fixedly. A translatable nozzle is mounted coaxially with the electrode forming a plasma chamber therebetween. The nozzle is resiliently biased into contact with the electrode by a spring element. A retaining cap is attached to the torch body to capture and position the nozzle. In one embodiment, the spring element is a separate component, being assembled in the torch after insertion of the nozzle and prior to attachment of the retaining cap. In another embodiment, the spring element is attached to the nozzle, forming an integral assembly which is meant to be replaced as an assembly and not further disassembled by the user. In yet another embodiment, the spring element is attached to the retaining cap, forming an integral assembly therewith. In a further embodiment, both the electrode and nozzle are mounted fixedly in combination with a translatable segmented swirl ring. An electrically conductive portion of the swirl ring is biased into contact with the electrode by a spring element, which may be a separate component or form an integral assembly with any of the nozzle, retaining cap or swirl ring. The spring element may be any of a variety of configurations including, but not limited to, a wave spring washer, finger spring washer, curved spring washer, helical compression spring, flat wire compression spring, or slotted conical disc.

According to the method of the invention, the translatable component is biased into contact with the fixed electrode by the spring element in the assembled state. After provision of electrical current which passes through the electrode and component, gas is provided to the plasma chamber having sufficient flow rate and pressure to overcome the biasing force of the spring element, resulting in a pilot arc condition upon translation of the component away from the electrode. The arc may then be transferred to a metallic workpiece in the conventional manner for subsequent processing of the workpiece as desired.

Several advantages may be realized by employing the structure and method according to the invention. For example, in cutting and marking applications, the invention provides more reliable plasma torch contact starting. In prior art designs employing a movable electrode and fixed nozzle, there are often additional moving parts and mating surfaces such as a plunger and an electrically insulating plunger housing. These parts are permanently installed in the plasma torch in the factory and are not designed to be maintained in the field during the service life of the torch, which may be several years. These parts are subject to harsh operating conditions including rapid cycling at temperature extremes and repeated mechanical impact. In addition, in many cases the torch working fluid is compressed air, the quality of which is often poor. Oily mist, condensed moisture, dust, and debris from the air compressor or compressed air delivery line, as well as metal fumes generated from cutting and grease from the operator's hands introduced when changing consumable torch parts all contribute to the contamination of the smooth bearing surfaces permanently installed in the torch. Over time, these contaminants affect the free movement of the parts necessary to assure reliable contact starting of the pilot arc. Part movement becomes sluggish and eventually ceases due to binding, resulting in torch start failures. Many torches fail prematurely due to these uncontrollable variations in field operating conditions. These failures can be directly attributed to the degradation of the surface quality of the relatively moving parts. One significant advantage of this invention is the use of moving parts and mating surfaces which are routinely replaced as consumable components of the torch. In this manner, critical components of the torch contact starting system are regularly renewed and torch performance is maintained at a high level.

The invention also provides enhanced conductive heat transfer from the hot electrode to cool it more efficiently. In prior art contact start systems with a movable electrode, because the electrode must move freely with respect to mating parts, clearance is required between the electrode and proximate structure. This requirement limits the amount of passive heat transfer from the electrode into the proximate structure. According to the invention, the electrode, which is the most highly thermally stressed component of the plasma torch, is securely fastened to adjacent structure which acts as an effective heat sink. The intimate contact greatly reduces interface thermal resistivity and improves electrode conductive cooling efficiency. As a result, the better cooled electrode will generally have a longer service life than a prior art electrode subject to similar operating conditions.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DETAILED DESCRIPTION OF THE INVENTION

Figure 1A:
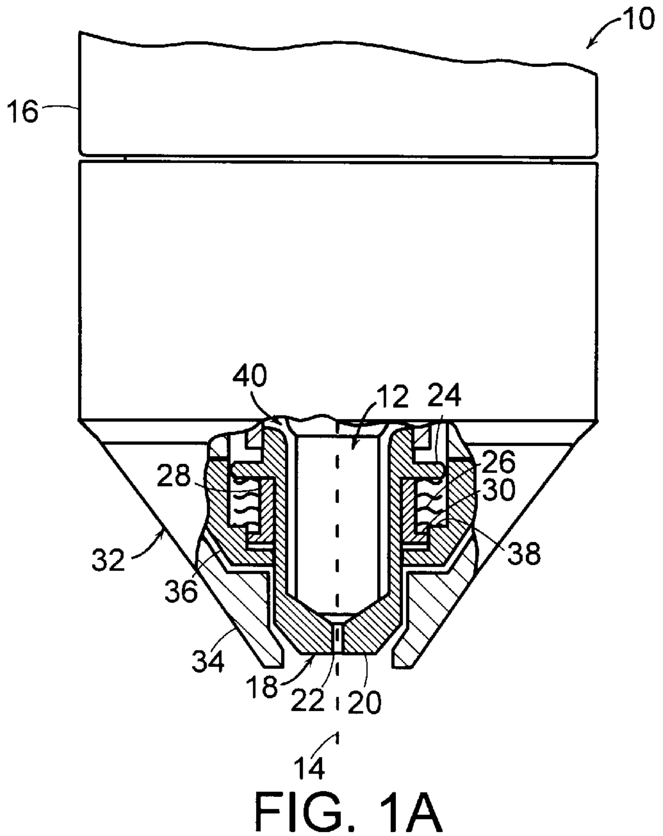
FIG. 1A is a schematic partially cut away sectional view of a plasma arc torch working end portion in a de-energized mode in accordance with a first embodiment of the present invention.

Depicted in FIG. 1A is a schematic partially cut away sectional view of the working end portion of a dual flow plasma arc torch 10 in a de-energized mode in accordance with a first embodiment of the present invention. As used herein, the term "de-energized" describes the configuration of the torch components prior to pressurization of the plasma chamber. This configuration is also consistent with the unpowered, assembled condition. The torch 10 includes a generally cylindrical body 16 and an electrode 12 which is fixedly mounted along a centrally disposed longitudinal axis 14 extending through the body 16 and the torch 10. Unless otherwise specified, the components of the torch 10 each have a respective longitudinal axis of symmetry and are assembled generally colinearly along the longitudinal axis 14 of the torch 10. The electrode 12 is isolated electrically from the torch body 16 which may serve as a handgrip for manually directed workpiece processing or as a mounting structure for use in an automated, computer controlled cutting or marking system.

A nozzle 18, disposed substantially colinearly with axis 14 and abutting the electrode 12, is translatable along axis 14 within predetermined limits. The nozzle 18 is manufactured as an integral assembly of three components: a generally cylindrical hollow member 20; a spring element 26; and a retainer collar 28. The generally cylindrical hollow member 20 has an open end portion for receiving the electrode 12 and a closed end portion with a centrally disposed orifice 22 for discharge of high energy plasma during torch operation. The exterior of the nozzle member 20 includes a radially extending flange 24 forming a reaction surface for the spring element 26. As will be discussed in greater detail hereinbelow with respect to FIGS. 5A–5F, various configuration springs may be employed to achieve the desired biasing of the nozzle member 20 in the direction of contact with the electrode 12. Lastly, the nozzle 18 includes a retainer collar 28 having an outwardly disposed flange 30. The collar 28 serves several functions including limiting translational travel of the nozzle member 20 in the torch 10 and capturing the spring element 26 with the flange 30 as part of the integral assembly of the nozzle 18. The collar 28 may be attached to the exterior portion of the member 20 by diametral interference fit or any other conventional method such as mechanical threading, thermal brazing, etc.

The nozzle 18 is secured in the torch 10 by means of a retaining cap 32. The cap 32 may be attached to the body 16 by a threaded or other conventional connection to facilitate disassembly of the torch 10 to replace consumables. The cap 32 includes a hollow frustoconical outer shell 34 and a preload ring 36 coaxially disposed therein. The annular preload ring 36 circumscribes the nozzle 18 and includes an interior longitudinally disposed step 38 which abuts spring element 26 and provides additional spring element compression or preload in the assembled state.

Figure 1B:
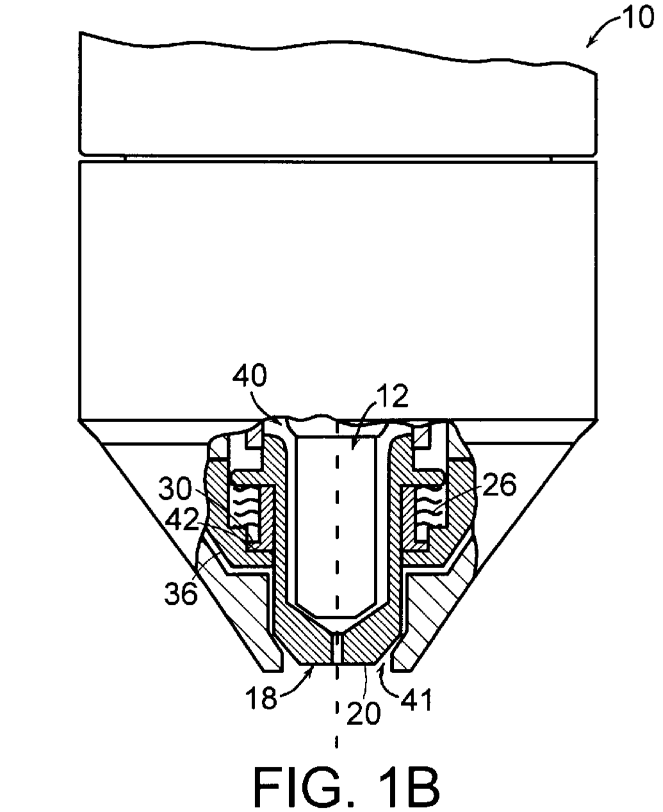
FIG. 1B is a schematic sectional view of the plasma arc torch working end portion depicted in FIG. 1A in a pilot arc mode in accordance with a first embodiment of the present invention.

The interior configuration of the nozzle 18 is sized to provide radial clearance when disposed proximate the electrode 12, forming plasma chamber 40 therebetween. A controlled source of pressurized gas (not depicted) in fluid communication with the chamber 40 provides the requisite gas to be converted into a high energy plasma for workpiece processing. The pressurized gas in the chamber 40 also reacts against the biasing effect of the spring element 26 and is employed to translate the nozzle 18 relative to the electrode 12 during initiation of the pilot arc as depicted in FIG. 1B.

To start the torch 10, a low level electrical current is provided serially through the electrode 12 and abutting nozzle 18 as depicted in FIG. 1A. Thereafter, gas is provided to the plasma chamber 40 having sufficient flow rate and pressure to overcome the bias of spring element 26, resulting in a pilot arc condition upon separation of the electrode 12 and nozzle 18. In this dual flow torch 10, gas would also be provided to the annulus 41 disposed between the interior of shell 34 and proximate exterior surfaces of nozzle member 20 and preload ring 36. As depicted in FIG. 1B, the nozzle 18 has moved in a downward direction, providing axial and radial clearance relative to the electrode 12. Translation of the nozzle 18 is limited by abutment of the nozzle collar flange 30 with a second longitudinal step 42 of the preload ring 36. The nozzle 18 remains displaced for the duration of operation of the torch 10 in both pilot arc and transferred arc modes. Upon shutdown of the torch 10, the flow of gas to plasma chamber 40 and annulus 41 is terminated. As the pressure in chamber 40 diminishes, the spring element force becomes dominant and the nozzle 18 translates upward into abutting relation with the electrode 12.

In order to facilitate reliable pilot arc initiation, it may be desirable that the spring element 26 be electrically conductive, non-oxidizing, and maintained in intimate contact with the nozzle flange 24 and preload ring 36 during nozzle translation. By providing a low resistance electrical path, the spring element 26 substantially eliminates microarcing between sliding surfaces of the flange 24 and preload ring 36 caused by stray electrical discharges which tend to increase sliding friction therebetween.

Figures 2A, 2B, 2C:
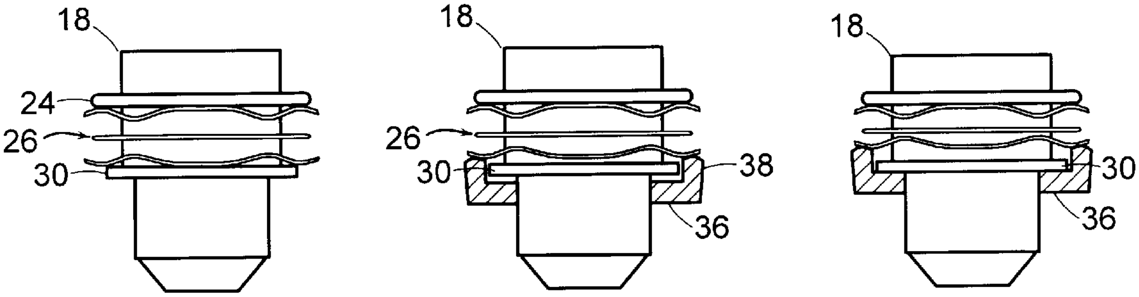
FIG. 2A is a schematic side view of a nozzle with integral spring element in accordance with a first embodiment of the present invention.
FIG. 2B is a schematic side view of the nozzle depicted in FIG. 1A in a preload assembled state in accordance with this embodiment of the present invention.
FIG. 2C is a schematic side view of the nozzle depicted in FIG. 1B in a pressurized assembled state in accordance with this embodiment of the present invention.

FIGS. 2A–2C depict the nozzle 18 in three respective states: as an integral assembly prior to insertion in the torch 10; in a preloaded state after insertion in the torch 10 but prior to pressurization of the plasma chamber 40; and after insertion in the torch 10 subsequent to pressurization of the plasma chamber 40. Referring first to FIG. 2A, during initial manufacture of the integral assembly, a slight compression of the spring element 26 may be desirable to ensure proper seating of spring element ends against member flange 24 and collar flange 30. Spring element 26 is thereby axially captured at both flanges 24, 30. The depiction of spring element 26 is schematic in nature and may include solely a single biasing element or a plurality of similar or dissimilar stacked elements. Once installed in the torch 10, as depicted in FIG. 2B, the spring element 26 is compressed further by step 38 of preload ring 36. By changing the relative dimension of the step 38, the amount of preload and concomitantly the amount of pressure required in the plasma chamber 40 to separate the nozzle 18 from the electrode 12 can be varied. Note the longitudinal clearance between the collar flange 30 and the preload ring 36 which limits translational travel of the nozzle 18. This clearance determines the gap between the electrode 12 and nozzle 18 upon pressurization of the plasma chamber 40. The clearance dimension should be large enough to provide a sufficient gap between the electrode 12 and nozzle 18 so that a stable pilot arc may form; however, the dimension must not be so large that the gap between the electrode 12 and nozzle 18 becomes too great and available open circuit voltage provided by the power supply becomes inadequate to sustain the pilot arc. A typical range of nozzle travel is between about 0.010 inches (0.254 mm) and about 0.100 inches (2.54 mm), depending on the amperage rating of the torch. For example, for a 20 ampere torch, nominal nozzle travel may be about 0.015 inches (0.381 mm) and for a 100 ampere torch, nominal nozzle travel may be about 0.065 inches (1.651 mm). For higher current torches, nominal nozzle travel will typically be greater. Lastly, FIG. 2C depicts the relative position of the nozzle 18 and preload ring 36 during torch operation with the nozzle 18 at the limit of travel, the collar flange 30 abutting the ring 36.

By way of example, for a spring element 26 having a spring rate of 48 pounds/inch (8.57 kg/cm) and a free length of 0.180 inches (4.57 mm), typical preload length in the assembled torch 10 would be 0.130 inches (3.30 mm), corresponding to a preload force of about 2.40 pounds (1.09 kg). For nozzle travel equivalent to about 0.015 inches (0.381 mm), length of the spring element 26 at full nozzle travel would be about 0.115 inches (2.92 mm), corresponding to a spring force of about 3.12 pounds (1.42 kg). With a nozzle diameter of about 0.440 inches (1.12 cm) and a cross-sectional area of about 0.152 square inches (0.98 $cm^2$), upon pressurization of the plasma chamber 40 to about 40 psig (2.81 $kg/cm^2$ gauge), the pneumatic force is about 6.08 pounds (2.76 kg), almost twice the 3.12 pounds (1.42 kg) of force required to overcome the spring force. Accordingly, the nozzle 18 will be translated reliably during contact starting and maintained at full travel during torch operation.

By making the nozzle 18 an integral assembly of member 20 and spring element 26, replacement and renewal of spring element 26 is assured whenever the nozzle 18 is replaced. Accordingly, starting system reliability is not impaired by thermal or mechanical degradation of the spring element 26, and misassembly of the torch 10 without the spring element 26 is avoided.

Figures 3A, 3B:
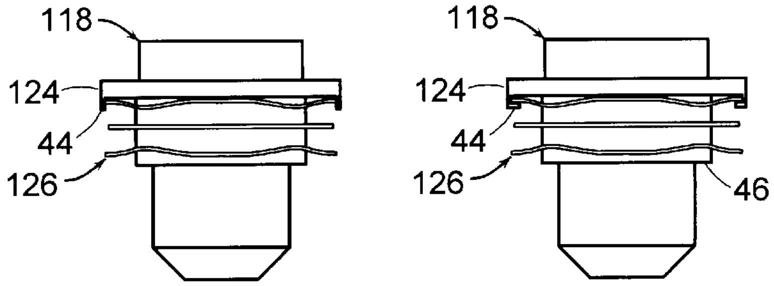
FIG. 3A is a schematic side view of a partially assembled nozzle with integral spring element in accordance with another embodiment of the present invention.
FIG. 3B is a schematic side view of the nozzle depicted in FIG. 3A after completion of assembly in accordance with this embodiment of the present invention.

Other methods of retaining the spring element 26 as part of the integral assembly nozzle 18 are provided hereinafter. For example, instead of axially capturing the spring element 26 between opposing flanges 24, 30, one end of the spring element 26 can be attached as depicted in FIGS. 3A–3B. Referring first to FIG. 3A, the exterior of the nozzle 118 includes a radially extending flange 124 forming both a retention and a reaction surface for spring element 126. Prior to assembly, flange 124 includes a longitudinally extending lip 44 which may be circumferentially continuous or formed as a series of discrete, contiguous tabs. The spring element 126 is axially retained by plastically deforming the lip 44 around a proximate portion of the element 126 as depicted in FIG. 3B. Translational travel of the nozzle 118 when assembled in the torch 10 is limited by nozzle body step 46 or other similar feature integrally formed therein. The step 46 abuts similarly against preload ring 36 at plasma chamber pressurization as described hereinabove with respect to travel of nozzle 18.

Figure 4B:
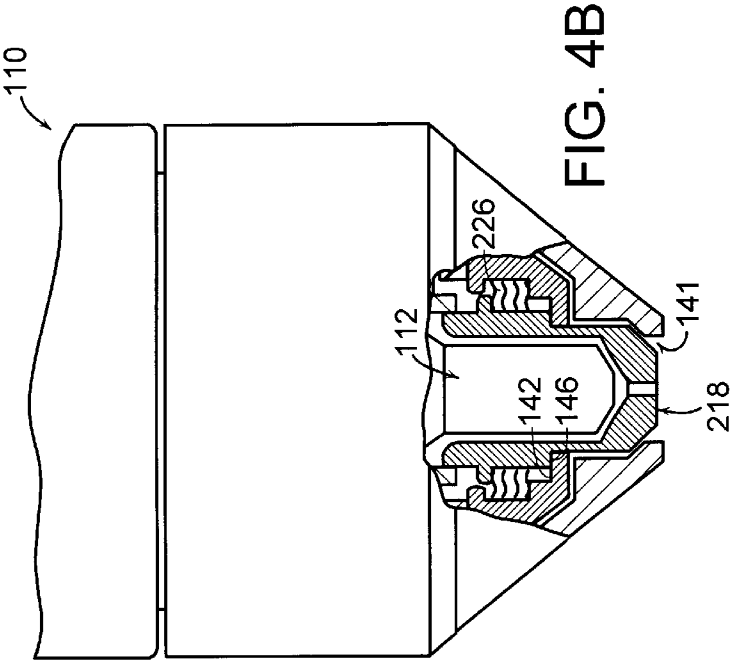
FIG. 4B is a schematic partially cut away sectional view of the plasma arc torch working end portion depicted in FIG. 4A in a pilot arc mode in accordance with this embodiment of the present invention.
Figure 4A:
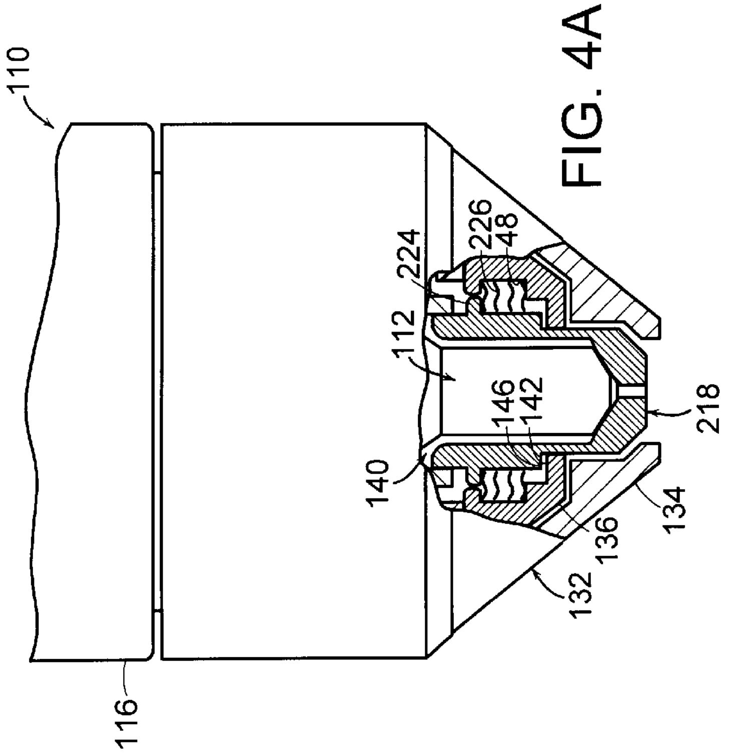
FIG. 4A is a schematic partially cut away sectional view of a plasma arc torch working end portion in a de-energized mode in accordance with yet another embodiment of the present invention.
Figure 4C:
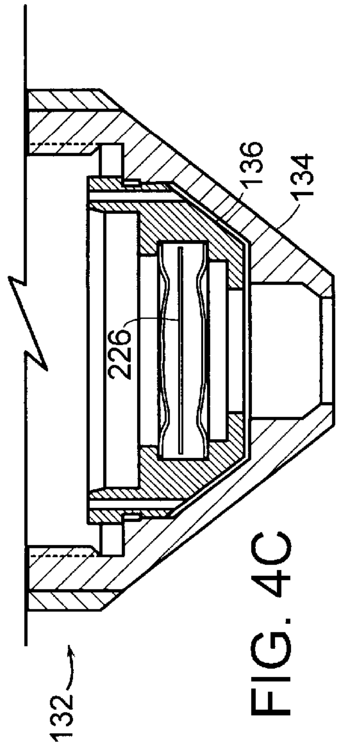
FIG. 4C is a schematic sectional view of the retaining cap depicted in FIG. 4A prior to assembly in the plasma arc torch in accordance with this embodiment of the present invention.

In another embodiment of the present invention, desired functionality is achieved by combining the spring element as a component of the retaining cap or preload ring, instead of the nozzle, as shown in FIGS. 4A–4C. Referring first to FIG. 4A, the working end portion of a dual flow plasma arc torch 110 is depicted in assembled or de-energized mode in accordance with this embodiment of the present invention. The torch 110 includes a centrally disposed electrode 112 and nozzle 218. The nozzle 218 may be of unitary construction and includes a radially extending flange 224 which acts a reaction surface for spring element 226.

The nozzle 218 is captured in the torch 110 by a retaining cap 132. The cap 132 includes a hollow frustoconical outer shell 134 which captures preload ring 136 coaxially disposed therein. The preload ring 136 includes an annular groove 48 along an interior portion thereof, sized and configured to receive therein spring element 226. Due to the compliant nature of the spring element 226, the preload ring 136 may be manufactured of unitary construction and the spring element 226 thereafter inserted in the groove 48. Absent direct attempt to pry the spring element 226 from the groove 48, the spring element 226 will be retained in the preload ring 136 and may be considered an integral assembly for the purposes disclosed herein.

To assemble the torch 110, the nozzle 218 is first disposed over the electrode 112, followed by the preload ring 136 with integral spring element 226. The shell 134 is thereafter attached to the torch body 116. In the assembled state, the nozzle 218 is biased into abutting relation with the electrode 112 by the reaction of spring element 226 against nozzle flange 224.

Nozzle 218 is longitudinally translatable away from the electrode 112 under pressure in plasma chamber 140, the distance regulated by the clearance between nozzle step 146 and preload ring step 142. Here again, this assembly clearance is predetermined to ensure reliable initiation and maintenance of the pilot arc. FIG. 4B depicts the relative position of the nozzle 218 at full travel in the pressurized, pilot arc state. Note, relative to FIG. 4A, compression of the spring element 226, longitudinal clearance between the nozzle 218 and electrode 112, and abutment of nozzle step 146 with preload ring step 142.

FIG. 4C is a schematic sectional view of the retaining cap 132 depicted in FIG. 4A prior to assembly in the torch 110. Neither the electrode 112 nor the nozzle 218 have been illustrated in this view for clarity of illustration. The retaining cap 132 may be manufactured of unitary construction or as an assembly with the integral spring element 226. Alternatively, the cap 132 may be manufactured as a shell 134 and mating preload ring 136. Additional desirable features for the proper functioning of the torch 110 may be readily incorporated, for example, gas circuits for feeding the flow in annulus 141. Providing discrete components to form the cap 132 facilitates use of matched sets of electrodes 112, nozzles 218, and preload rings 136 with a common outer shell 134 to accommodate different power levels and applications.

Whether to incorporate a spring element as an integral part of a nozzle assembly or cap (or preload ring) may be influenced by the useful lives of the components. It is desirable to replace the spring element prior to degradation and therefore it may be incorporated advantageously in a component with a comparable or shorter usable life.

As discussed briefly hereinabove, any of a variety of spring configurations may be employed to achieve the desired biasing function of the spring element. One desirable feature is the capability of the spring element to withstand the high ambient temperatures encountered in the working end portion of a plasma arc torch 10. Another desirable feature is the capability to predict usable life as a function of thermal and/or mechanical cycles. Accordingly, the material and configuration of the spring element may be selected advantageously to provide reliable, repeatable biasing force for the plasma chamber gas pressures employed for the useful lives of the integral nozzle or retaining cap.

With reference to FIGS. 5A–5F, several embodiments of spring configurations which may be employed to achieve the aforementioned functionality are depicted. These embodiments are exemplary in nature and are not meant to be interpreted as limiting, either in source, material, or configuration.

Figure 5A:
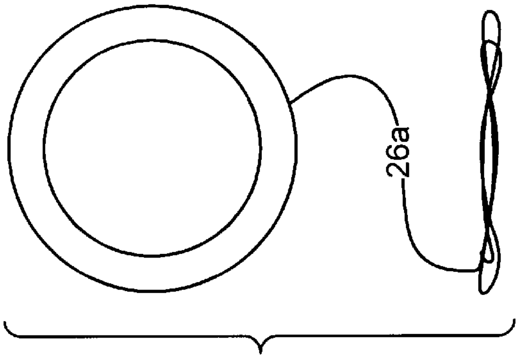
FIGS. 5A–5F are schematic plan and side views of six exemplary spring elements in accordance with various embodiments of the present invention.

FIG. 5A shows schematic plan and side views of a resilient component commonly referred to as a wave spring washer 26*a*, conventionally used in thrust load applications for small deflections with limited radial height. The washer 26*a* has a generally radial contour; however, the surface undulates gently in the longitudinal or axial direction. The washer 26*a* is available in high-carbon steel and stainless steel from Associated Spring, Inc., Maumee, Ohio 43537.

Figure 5B:
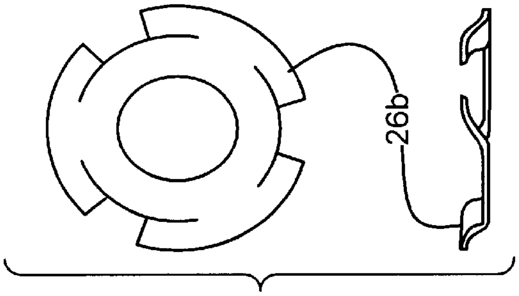

As depicted in FIG. 5B, schematic plan and side views are provided of a resilient component commonly referred to as a finger spring washer 26*b*, conventionally used to compensate for excessive longitudinal clearance and to dampen vibration in rotating equipment. The washer 26*b* has a discontinuous circumference with axially deformed outer fingers. The washer 26*b* is available in high carbon steel from Associated Spring, Inc.

Figure 5C:
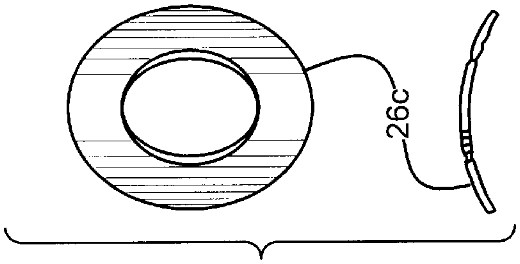

FIG. 5C shows schematic plan and side views of a resilient component commonly referred to as a curved spring washer 26*c*, typically used to compensate for longitudinal clearance by exertion of low level thrust load. The washer 26*c* has a radial contour and a bowed or arched surface along an axial direction. The washer 26*c* is available in high-carbon steel and stainless steel from Associated Springs, Inc.

Figure 5D:
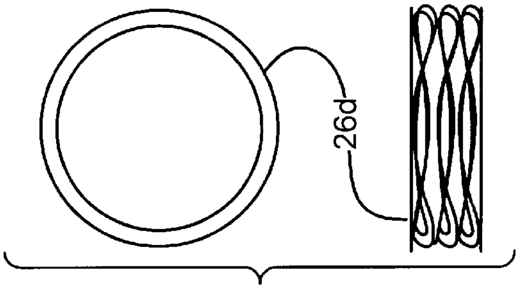

As depicted in FIG. 5D, schematic plan and side views are provided of a resilient component commonly referred to as a flat wire compression spring 26*d* of the crest-to-crest variety. The spring 26*d* has a radial contour and a series of undulating flat spring turns which abut one another at respective crests. This particular embodiment includes planar ends and is available in carbon steel and stainless steel from Smalley Steel Ring Company, Wheeling, Ill. 60090.

Figure 5E:
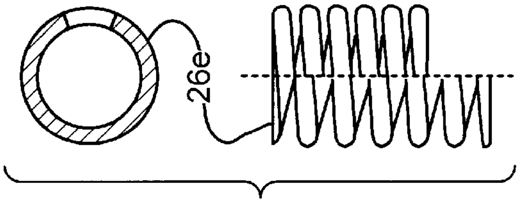

FIG. 5E shows schematic plan and side views of a common helical compression spring 26*e*, the side view depicting both free state and compressed contours. The spring 26*e* has squared, ground ends and is available from Associated Spring, Inc. in music wire for ambient temperature applications up to about 250° F. (121° C.) and stainless steel for ambient temperature applications up to about 500° F. (260° C.).

Figure 5F:
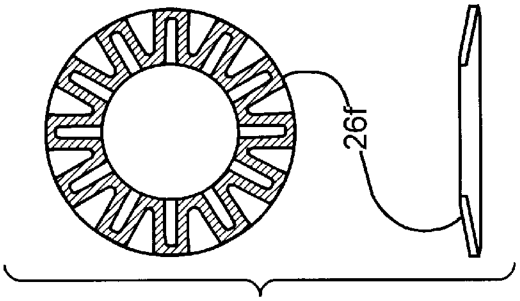

As depicted in FIG. 5F, schematic plan and side views are provided of a resilient component known as a slotted conical disc or RINGSPANN™ Star Disc 26*f*, commonly employed to clamp an internally disposed cylindrical member relative to a circumscribed bore or to retain a member on a shaft. The disc 26*f* has a radial contour with alternating inner and outer radial slots and a shallow conical axial contour which provides the desired biasing force for use as a spring element. Stiffness is a function of both disc thickness and slot length. Disc 26*f* is available in hardened spring steel from Powerhold, Inc., Middlefield, Conn. 06455.

Figure 6B:
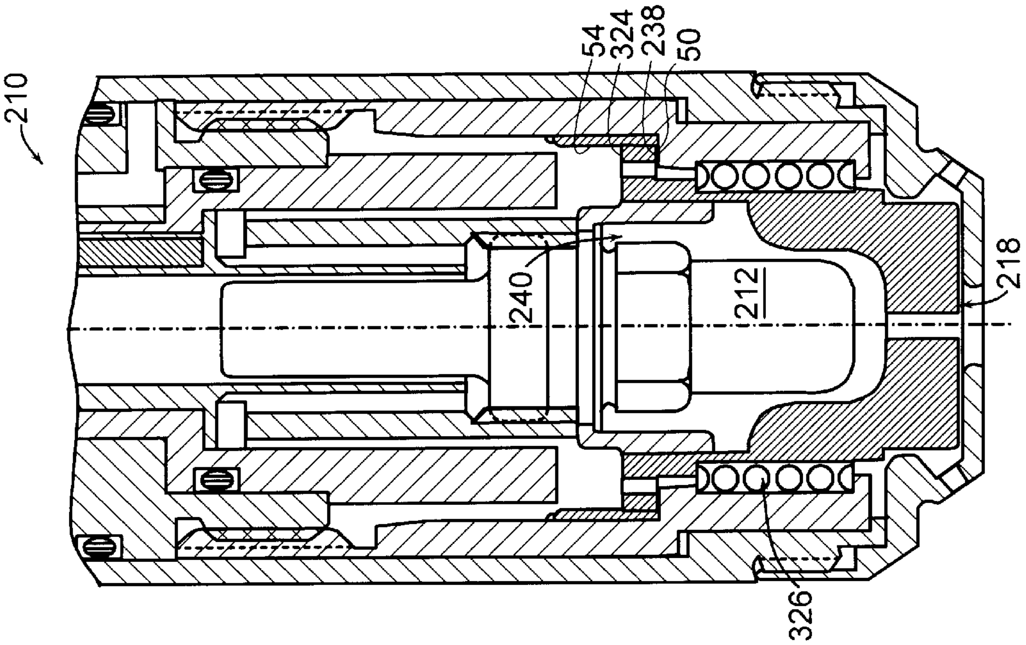
FIG. 6B is a schematic sectional view of the plasma arc torch working end portion depicted in FIG. 6A in a pilot arc mode in accordance with this embodiment of the present invention.
Figure 6A:
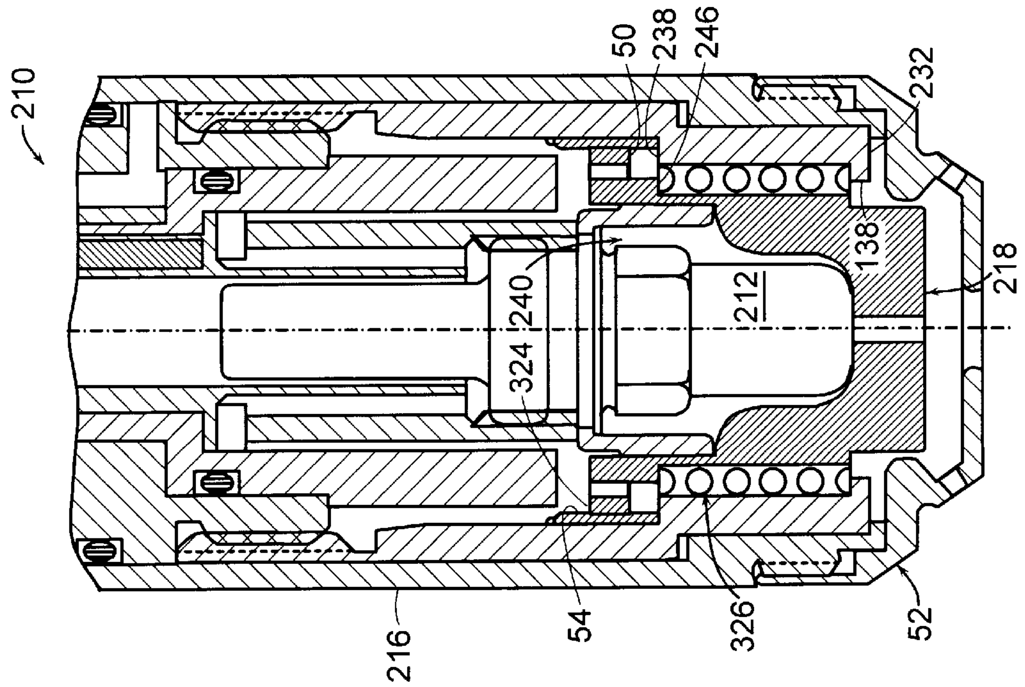
FIG. 6A is a schematic partially cut away sectional view of a plasma arc torch working end portion in a de-energized mode in accordance with a further embodiment of the present invention.

While it is desirable that the spring element 26 be integral with the nozzle 18 or retaining cap 32 to ensure replacement with other consumables, it is not necessary. For example, FIG. 6A depicts a schematic partially cut away sectional view of the working end portion of an air cooled plasma arc torch 210 in a de-energized mode in accordance with a further embodiment of the present invention. The torch 210 includes a nozzle 218 biased into abutting relationship with a centrally disposed electrode 212 by spring element 326, depicted here as a helical compression spring. The nozzle 218 is of unitary construction and includes a longitudinal step 246 on flange 324 against which spring element 326 reacts. Spring element 326 also reacts against step 138 of retaining cap 232. Nozzle 218 further includes a radially extending flange 50 radially aligned with cap step 238, the longitudinal clearance therebetween defining the limit of travel of the nozzle 218 when plasma chamber 240 is fully pressurized. To assemble torch 210, the nozzle 218 is disposed over the mounted electrode 212, the spring element 326 is inserted and the retaining cap 232 attached to the body 216 by a threaded connection or other means. The free state length of spring element 326 and assembled location of cap step 138 and nozzle step 246 are predetermined to ensure the desired spring element preload at assembly. The torch 210 also includes a gas shield 52 which is installed thereafter for channeling airflow around the nozzle 218.

The torch 210 includes an optional insulator 54 disposed radially between retaining cap 232 and nozzle flange 324. The insulator 54 may be affixed to the retaining cap 232 by radial interference fit, bonding, or other method and should be of a dimensionally stable material so as not to swell or deform measurably at elevated temperatures. An exemplary material is VESPEL™, available from E. I. du Pont de Nemours & Co., Wilmington, Del. 19898. By providing the insulator 54 between the flange 324 and retaining cap 232, micro-arcing and associated distress along the sliding surfaces thereof during translation of the nozzle 218 is prevented which otherwise could tend to bind the nozzle 218. To provide a reliable electrical current path through the spring element 326 during pilot arc initiation, a helical metal compression spring with flat ground ends may be employed as depicted. The spring should be made of a non-oxidizing material such as stainless steel and need only support initial current flow between the nozzle 218 and retainer 232 during nozzle translation because at full nozzle travel, nozzle step 246 abuts retaining cap step 238 as depicted in FIG. 6B. The torch configuration in the pilot arc state with the plasma chamber 240 pressurized and the nozzle 218 at full travel is depicted in FIG. 6B.

Figure 7:
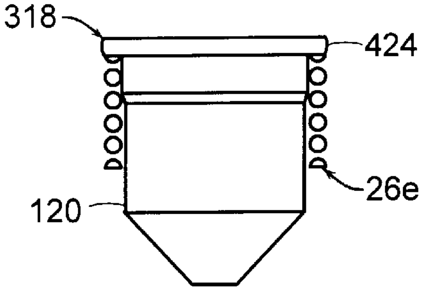
FIG. 7 is a schematic side view of a nozzle with integral spring element in accordance with a still another embodiment of the present invention.

When using a helical compression spring 26*e* as the spring element, a substantially integral assembly of the spring 26*e* and nozzle cylindrical member 120 can be achieved as depicted in nozzle 318 in FIG. 7. The nominal diameter of the member 120 is increased proximate the nozzle flange 424 against which the spring 26*e* abuts to create a radial interference fit therewith. The remainder of the member 120 has a nominal diameter less than the nominal bore of the spring 26*e*. Accordingly, once the spring 26*e* has been seated on the member 120, the spring 26*e* is firmly retained, cannot be misplaced or left out of the assembly, and can be replaced as a matter of course when the nozzle 318 is replaced.

Figure 8B:
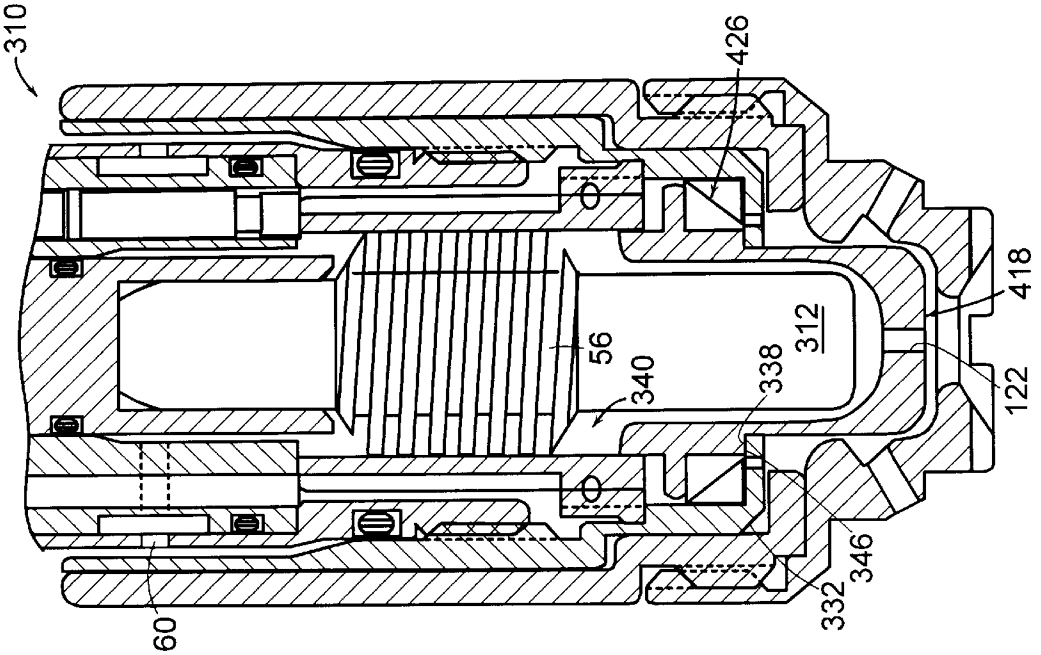
FIG. 8B is a schematic sectional view of the plasma arc torch working end portion depicted in FIG. 8A in a pilot arc mode in accordance with this embodiment of the present invention.
Figure 8A:
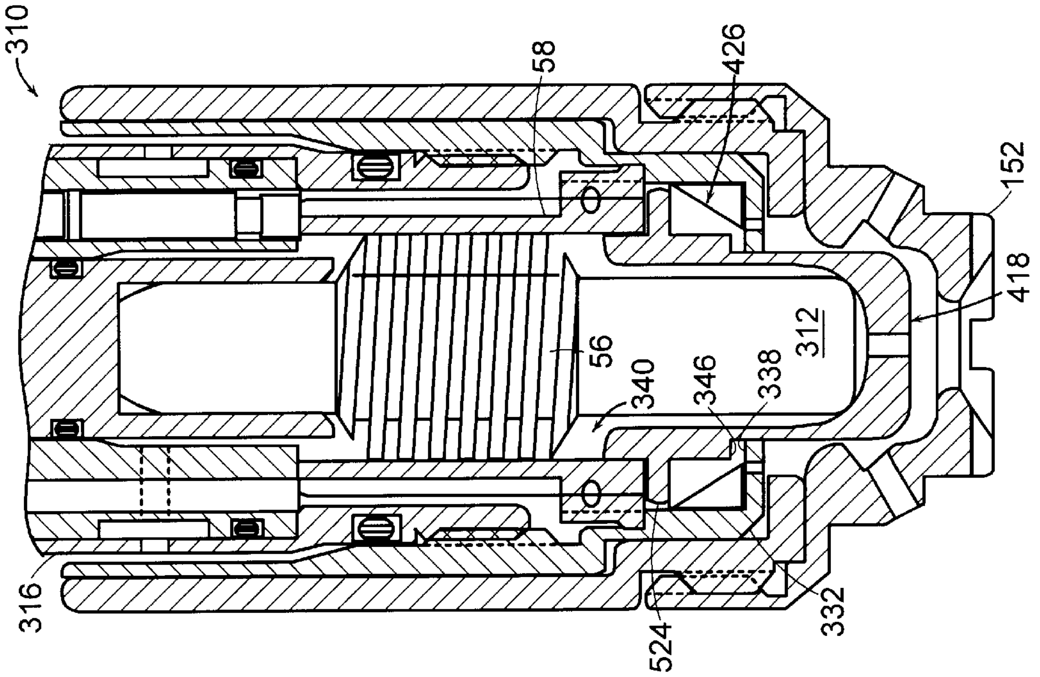
FIG. 8A is a schematic sectional view of a plasma arc torch working end portion in a de-energized mode in accordance with an additional embodiment of the present invention.

Referring now to FIG. 8A, plasma arc torch 310 is depicted in a de-energized mode in accordance with an additional embodiment of the present invention. The torch 310 includes a centrally disposed electrode 312 having a spiral gas flow passage 56, of the type disclosed in the '871 patent, machined into a radially enlarged shoulder portion thereof. The electrode 312 is mounted fixedly in the torch 310, which also includes a translatable nozzle 418. The nozzle 418 may be of unitary construction and includes a radially extending flange 524 which acts a reaction surface for spring element 426, depicted here schematically as a "Z" in cross-section.

Spring element 426 also reacts against step 338 of retaining cap 332. Nozzle 418 further includes a radially extending step 346 radially aligned with cap step 338, the longitudinal clearance therebetween defining the limit of travel of the nozzle 418 when plasma chamber 340 is fully pressurized. To assemble torch 310, the nozzle 418 is disposed over the helically grooved mounted electrode 312 and swirl ring 58, the spring element 426 is inserted and the retaining cap 332 attached to the body 316 by a threaded connection. The free state length of spring element 426 and assembled location of cap step 338 and nozzle flange 524 are predetermined to ensure the desired spring element preload at assembly. Torch 310 also includes a gas shield 152 which is installed thereafter for channeling airflow around the nozzle 418. The spring element 426 may be a separate component, as depicted, or may be attached to either the nozzle 418 at flange 524 or retaining cap 332 proximate step 338 by any method discussed hereinabove, depending on the type of spring employed.

Referring to FIG. 8B, the torch 310 is depicted in the pilot arc state. Pressurization of plasma chamber 340 causes longitudinal translation of the nozzle 418 away from electrode 312, compressing spring element 426. Plasma gas pressure and volumetric flow rate are sufficiently high to compress spring element 426 while venting gas to ambient through orifice 122 and aft vent 60 after passing through spiral passage 56. Reference is made to the '871 patent for further detail related to the sizing of the spiral passage to develop the desired pressure drop across the electrode 312. The passage 56 both enhances cooling of the electrode and develops back pressure to facilitate pressurization of plasma chamber 340 and translation of the nozzle 418. At full travel, nozzle step 346 abuts retaining cap step 338.

Figure 9B:
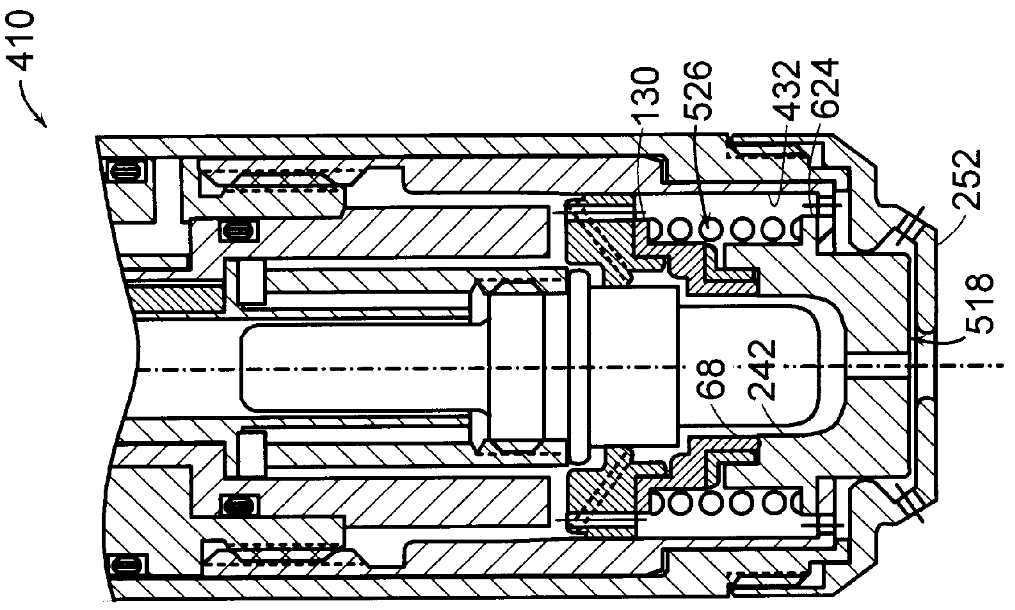
FIG. 9B is a schematic sectional view of the plasma arc torch working end portion depicted in FIG. 9A in a pilot arc mode in accordance with this embodiment of the present invention.
Figure 9A:
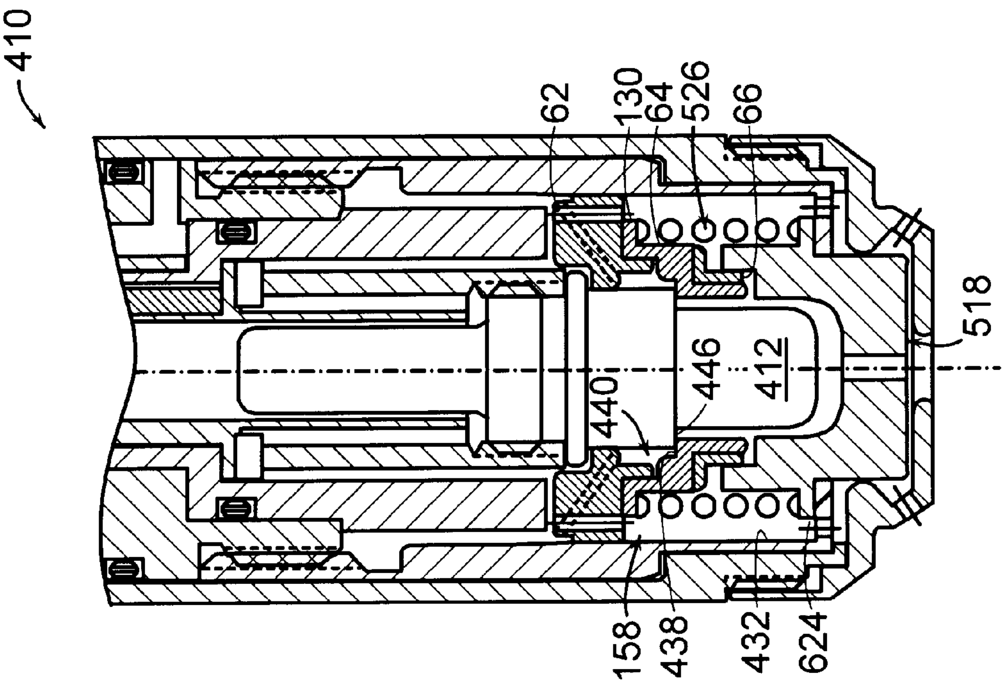
FIG. 9A is a schematic partially cut away sectional view of a plasma arc torch working end portion in a de-energized mode in accordance with still another embodiment of the present invention.

FIG. 9A is a schematic partially cut away sectional view of a working end portion of plasma arc torch 410 in a de-energized mode in accordance with another embodiment of the present invention. Both electrode 412 and nozzle 518 are mounted fixedly in torch 410 with swirl ring 158 disposed therebetween to channel gas flow into plasma chamber 440 at the desired flow rate and orientation. Swirl ring 158 includes three components: aft ring 62, center ring 64 and forward ring 66. Aft and forward rings 62, 66 are manufactured from an electrically insulating material while center ring 64 is manufactured from an electrically conductive material such as copper. Spring element 526 reacts against radially outwardly extending nozzle flange 624 and swirl center ring flange 130. Retaining cap 432 preloads the spring element 526 at assembly and ensures intimate contact between aft facing step 438 of center ring 64 and forward facing step 446 of electrode 412. In order to initiate a pilot arc, current is passed through the electrode 412, center ring 64, spring element 526, and nozzle 518. When plasma chamber 440 is pressurized, center ring 64 translates toward the nozzle 518, compressing spring element 526 and drawing a pilot arc proximate the contact area of steps 438, 446. At full travel, as depicted in FIG. 9B, leg 68 of center ring 64 abuts step 242 of nozzle 518 making electrical contact therewith. The pilot arc transfers from the center ring 64 to the nozzle 518 and may thereafter be transferred to a workpiece in the conventional manner. By controlling the pressure and volumetric flow rate of the plasma gas, the center ring 64 may be translated quickly to ensure that the center ring 64 reaches the nozzle 518 before the pilot arc. By way of example, assuming an available pneumatic force of about 15 pounds (6.835 kg) or 66.89 Newtons and swirl ring mass of about 0.010 kg, the acceleration of the swirl ring 64 (ignoring friction of bearing surfaces) is about 21,950 ft/sec$^2$ (6690 m/sec$^2$). Assuming total travel of about 0.020 inches (0.508 mm), travel time will be about $3.9\times10^{-4}$ sec. The pilot arc travels longitudinally at the same velocity as the plasma gas. Accordingly, for a plasma gas volumetric flow rate of 0.5 ft$^3$/min ($2.36\times10^{-4}$ m$^3$/sec), passing through the annular plasma chamber 440 having a cross-sectional area of about 0.038 square inches ($2.43\times10^{-5}$ m$^2$), the velocity of the gas and pilot arc will be about 31.8 ft/sec (9.7 m/sec). The distance the arc will travel on the center swirl ring 64 in the $3.9\times10^{-4}$ sec of swirl ring travel will be about 0.149 inches (3.8 mm). As long the metallic center swirl ring 64 is at least 0.149 inches (3.8 mm) in longitudinal length, the center swirl ring 64 will land on the nozzle 518 before the pilot arc reaches the end of the swirl ring 64.

As depicted, the spring element 526 is a separate component; however, the center ring 64 or nozzle 518 could be modified readily to make the spring element an integral component therewith. For example, the external diameter of the nozzle 518 proximate flange 624 could be enlarged to create a diametral interference fit with spring element 526. Similarly, the swirl ring diameter proximate flange 130 could be enlarged. Alternatively, the spring element 526 could be retained by the retaining cap 432 by modifying the interior thereof with a groove, reduced diameter, or other similar retention feature.

By using a translatable swirl ring 158 in combination with a fixed nozzle 518, several advantages may be realized. First, water cooling of the nozzle S18 could be added for high nozzle temperature applications such as powder coating. Additionally, while torch 410 includes a gas shield 252, the torch 410 could be operated without the shield 252 to reach into workpiece corners or other low clearance areas. Since the translating components are disposed within the retaining cap 432, they would not be subject to dust, debris, and cutting swarf which might tend to contaminate sliding surfaces and bind the action of the contact starting system.

While there have been described herein what are to be considered exemplary and preferred embodiments of the present invention, other modifications of the invention will become apparent to those skilled in the art from the teachings herein. For example, the coil spring element 326 in FIGS. 6A–6B could alternatively be firmly retained as a component of the retaining cap 232 by creating a radial interference fit therewith proximate step 138. Additionally, any of the disclosed translatable, biased nozzle or swirl ring configurations could be used in combination with the translatable electrode feature disclosed in the '268 patent. The particular methods of manufacture of discrete components and interconnections therebetween disclosed herein are exemplary in nature and not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A nozzle for a plasma arc torch comprising:

a generally cylindrical hollow nozzle member having:

an open end;

a substantially closed end including a centrally disposed orifice; and an exterior surface having a radially extending flange; and a spring element disposed along said exterior surface, said spring element having a first end abutting said flange so as to resiliently bias said nozzle member along a longitudinal axis extending through said open and closed ends of said nozzle member when a second end of said spring is further disposed against adjacent structure, wherein said spring element is attached to said nozzle member, forming an integral assembly therewith.

2. The invention according to claim 1 wherein said spring element is attached to said nozzle exterior surface by a diametral interference fit along a portion thereof.

3. The invention according to claim 1 wherein said flange includes a deformable lip and said spring element is captured along said nozzle exterior surface by inelastically crimping said deformable lip along said spring element end.

4. The invention according to claim 1 wherein said nozzle further comprises a retainer collar disposed along said exterior surface, said collar having a radially extending flange such that said spring element is captured between said collar flange and said nozzle flange.

5. The invention according to claim 4 wherein said collar is attached to said nozzle exterior surface by a diametral interference fit along at least a portion thereof.

6. The invention according to claim 1 wherein said spring element is selected from the group consisting of wave spring washers, finger spring washers, curved spring washers, helical compression springs, flat wire compression springs, and slotted conical discs.

7. A retaining cap for a plasma arc torch comprising:

a hollow portion having a first end, a second end, and an interior surface; and a spring element disposed within said hollow portion so as to resiliently bias a nozzle disposed therein along a longitudinal axis of said retaining cap, said axis extending through said first and second ends, wherein said spring element is attached to said retaining cap, forming an integral assembly therewith.

8. The invention according to claim 7 wherein said retaining cap comprises a shell and a preload ring coaxially disposed therein, and further wherein said spring element is integral with said preload ring.

9. The invention according to claim 7 wherein said spring element is selected from the group consisting of wave spring washers, finger spring washers, curved spring washers, helical compression springs, flat wire compression springs, and slotted conical discs.

10. A nozzle for a plasma arc torch comprising:

a generally cylindrical hollow nozzle member comprising:

an open end;

a substantially closed end including a centrally disposed orifice; and an exterior surface including:

a first flange or step for abutting a spring element for biasing said nozzle member along a longitudinal axis extending through said open and closed ends; and a second flange or step for limiting translation of said nozzle member along said longitudinal axis when installed in said torch; and a spring element disposed along said exterior surface, said spring element having a first end abutting said first flange or step when a second end of said spring is further disposed against adjacent structure, wherein said spring element is attached to said nozzle member, forming an integral assembly therewith.

11. A generally cylindrical hollow nozzle member for a plasma arc torch using a contact starting system comprising:

an open end;

a substantially closed end including a centrally disposed orifice; and an exterior surface including a radially extending flange or step having a deformable lip for retaining a spring element along said exterior surface for forming an integral assembly therewith.

* * * * *